March 28, 1967  W. TAYLOR, JR  3,311,320
DISPENSING DEVICE

Filed Aug. 25, 1966  2 Sheets-Sheet 1

INVENTOR
WILLIAM TAYLOR, JR.

BY *William W. Stokes*

ATTORNEY

March 28, 1967 W. TAYLOR, JR 3,311,320
DISPENSING DEVICE

Filed Aug. 25, 1966 2 Sheets-Sheet 2

INVENTOR
WILLIAM TAYLOR, JR.

William D. Stokes

ATTORNEY

United States Patent Office 3,311,320
Patented Mar. 28, 1967

3,311,320
DISPENSING DEVICE
William Taylor, Jr., 2215 W. Indiana Ave.,
Elkhart, Ind. 46514
Filed Aug. 25, 1966, Ser. No. 580,140
15 Claims. (Cl. 242—128)

This is a continuation-in-part of U.S. application Ser. No. 354,354, filed Mar. 24, 1964, now U.S. Pat. No. 3,273,823.

This invention relates to a dispensing package and a device which is useful for the storage, transport and dispensing of coiled materials.

More particularly, the invention relates to a sturdy, easily manufactured dispensing device, which is simple to construct and yet sufficiently strong to make it useful for a number of industrial applications involving handling of coiled materials.

Briefly stated, the device of the present invention comprises a dispensing package which consists essentially of two or more symmetrical elements which are joined to form the device. Each of the symmetrical elements consists of at least one vertical member, a base member lying substantially at right angles to the vertical member in a horizontal plane and an upper member also at substantially right angles to the vertical member. Preferably these elements are formed from an integral piece of material such as metal tubing. When these symmetrical elements are superimposed on one another as described below, a dispensing package in the form of reel or spool having an upright spindle and a horizontal base is formed.

Thus, this invention has as an object the provision of a dispensing package for coiled materials which may be loaded or unloaded from transporting equipment without damage to the material.

A further object of the invention is to provide a dispensing package which permits dispensing of coiled materials with a minimum of twisting or damage.

A further object of the invention is to provide a storage and dispensing package for coiled materials such as wire, rod, bar, tubing, cordage, cable, rope, strip, sheet, etc. which may be of metal, paper, fiber, plastic, rubber or any combination thereof.

A further object of the invention is to provide a dispensing package which permits the storage and transport of a continuous sheet of metal either in the form of narrow strips which are successively radially layered upon the dispensing device, up to and including a wide strip which utilizes substantially the complete depth of dispensing device.

A further object of the invention is to provide a dispensing package for coiled material which is capable of being nested or stacked one within the other when loaded or unloaded so as to reduce storage area requirements and to permit handling a plurality of packages at one time.

A further object of this invention is to provide a dispensing and storage device which is adaptable to commercially available "pay-off" equipment, dispensing being accomplished by radial revolution or in a non-revolving helical pattern.

Still another and further object of the invention is to provide a dispensing and storage device which means for an easily attachable-detachable pick-up arm as an aid when stationary dispensing is required.

Another object is to provide a pick-up arm designed to follow the natural cast of each convolution in order to minimize surface abrasion and bending during pay-out.

A further object of the invention is to provide a dispensing device with means for steel banding or securing the coiled material to the dispensing package to insure minimum damage during shipping and handling.

A further object of the invention is to provide a dispensing device having a surface covering or coating which would shield the coiled material from abrasive damage.

Other and further objects of the invention will be disclosed as the description proceeds.

Essentially, the package device to which this invention is directed comprises several symmetrical support elements, each element having at least one upright member, a U shaped base member outwardly directed and lying in a substantially horizonal plane and an upper member inwardly directed at a substantially right angle to the upright member. Several symmetrical elements are joined by welding or other permanent fastening means into a light, yet strong, device.

The description that follows relate to the device comprising four symmetrical elements. It will be readily apparent that the same inventive concept can be used in devices having two, three, five or even more symmetrical elements. From the standpoint of strength, weight, durability and materials cost, the device comprised of four elements is preferred.

The invention will be more explicitly described by reference to the attached drawings in which.

Figure 1:
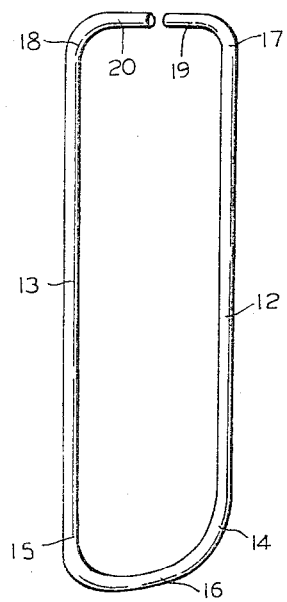
FIGURE 1 is a perspective view of one of the four symmetrical basic units of the device utilizing "double construction"
Figure 2:
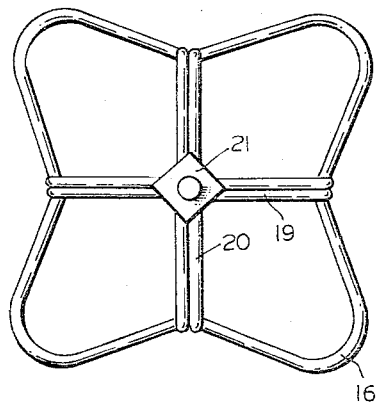
FIGURE 2 is a plan view of the four basic units assembled in "double construction"
Figure 3:
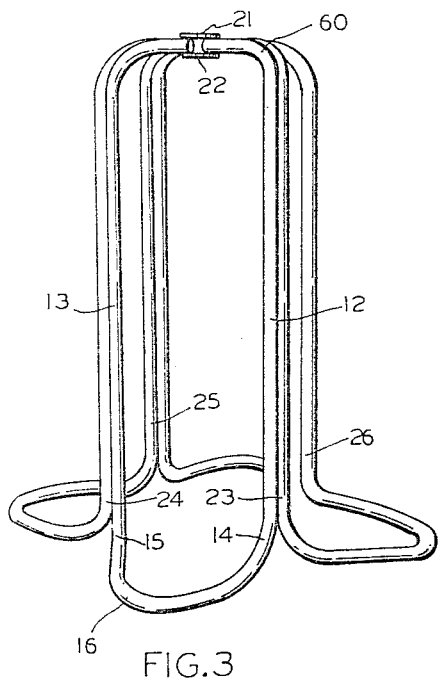
FIGURE 3 is a perspective view of the assembly of the "double construction" invention.

Turning to the drawings, in FIGURES 1, 2, and 3, which relate to the "double construction," reference numerals 12 and 13 refer to the upright or vertical members which are bent at a 90° angle as shown at 14 and 15 respectively. The integral section 16 is also bent along the horizontal plane in order to provide a substantially U shaped member lying in a horizontal plane and connecting between 14 and 15. The vertical members 12 and 13 are bent at their upper ends inwardly and at substantially at right angles at 17 and 18 to provide sections 19 and 20 which lie in a substantially horizontal plane and form a substantially right angle with each other.

Figure 8:
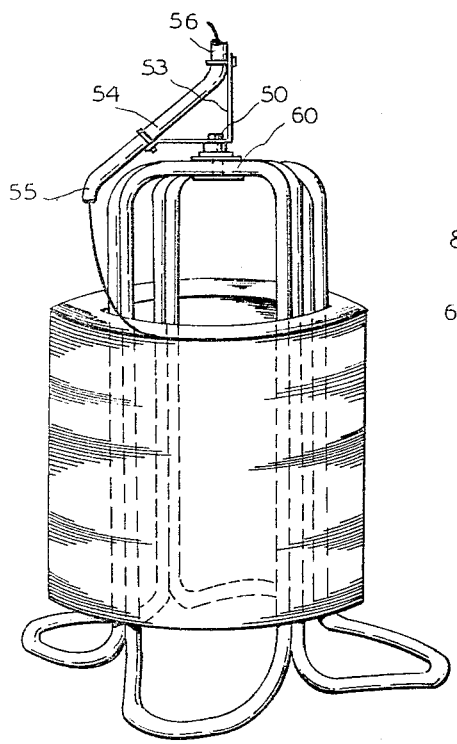
FIGURE 8 is a perspective view of the dispensing package with the pick-up arm attached and loaded with a coil of wire in position for unloading.
Figure 7:
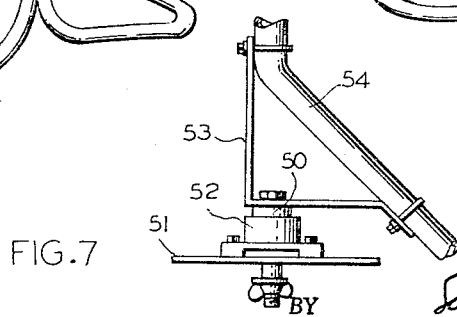
FIGURE 7 is an elevation of the pick-up arm assembly detached from the dispensing package.

Four fo the sections shown in FIGURE 1 are depicted in assembled form in FIGURES 2 and 3 to show the complete device 60 and including mounting plates 21 and 22 having bore holes to accommodate the detachable pick-up arm of FIGURE 7. The complete assembly is shown in FIGURE 8.

The mounting plates 21 and 22 provide a convenient means of attaching the four basic units together by any suitable method such as welding. The units are advantageously attached together at other points such as 23, 24, 25 and 26 as shown in FIGURE 3.

It will be noted that the "double construction" embodiment shown in FIGURES 1 thru 3 has the advantage of extra strength in each of the four vertical members and in each of the four inwardly disposed members by virtue of the presence of dual sections in these members. Where a lighter, less durable reel is required the "single construction" embodiment shown in FIGURES 4, 5 and 6 will prove adequate.

Figure 4:
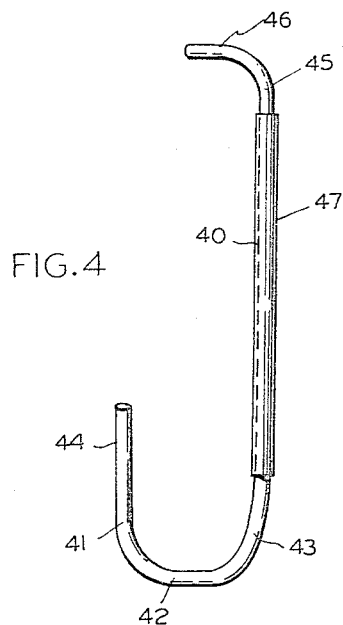
FIGURE 4 is a perspective view of one of the four symmetrical basic units of the device utilizing "single constructing"

The "single construction" device is essentially the same as the "double construction" device of FIGS. 1, 2 and 3 with the exception that each of the four vertical members and each of the four inwardly disposed horizontal members are formed from a single piece of structural material. The differences are readily apparent if FIGURES 1 and 4 showing a single element of the double and single construction devices respectively are compared. It is seen that the single construction element of FIGURE 4 differs from that of the double construction element of FIGURE 1 only in that the vertical member 13 and the inwardly disposed members 20 are eliminated.

The "single construction" element as shown in FIGURE 4 comprises a vertical member 40 bent at a 90° angle at 43. The integral section 42 is bent along the hroizontal plane in order to provide a substantially U shaped member lying in a horizontal plane and connecting between 43 and 41. The short section 44 is substantially vertical and is adapted to meet the next adjacent identical element along its vertical member. The vertical member 40 is also bent at 45 at substantially a 90° angle with the vertical member to provide section 46 lying in a substantially horizontal plane and inwardly directed. This section is adapted to meet the corresponding sections of the identical elements at a substantially central point.

Figure 5:
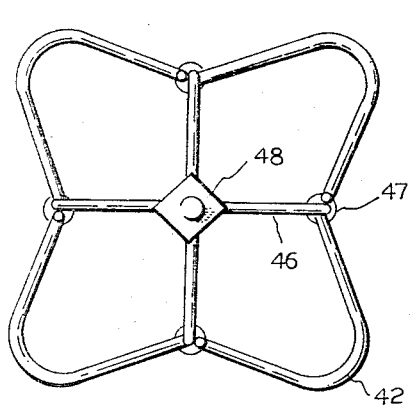
FIGURE 5 is a plan view of the four basic units assembled in "single construction"
Figure 6:
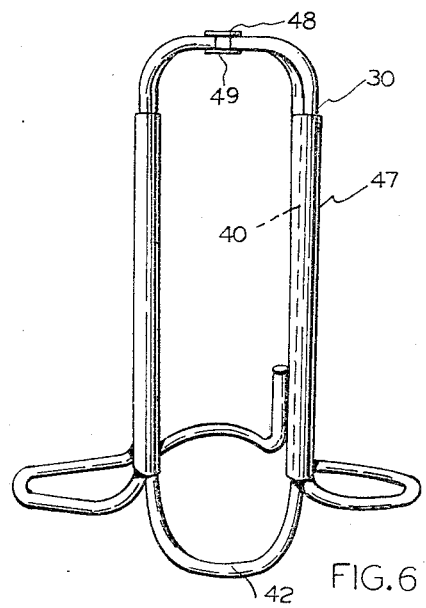
FIGURE 6 is a perspective view of the assembly of the invention in "single construction"

FIGURES 4, 5 and 6 further depict an improvement easily adaptable to the present invention, namely the sheath 47, a protective covering which extends along the vertical portion 40. The sheath is made of any suitable material such as plastic or rubber.

The sheath or protective covering may be in the form of tubing which is slipped over the vertical portion of the element of the dispensing package either before or after bending of the element to its proper configuration has been accomplished. It also may be a coating applied by well known means such as spraying.

The material used may be a plastic such as polyvinyl chloride, polyethylene or polyurethane foam, a rubber such as natural rubber or any of the well known synthetics such as neoprene or SBR.

The use of the proper sheathing material permits the shipment of many materials otherwise excluded because of abrasive damage caused by bouncing during handling and shipping.

FIGURES 5 and 6 show the assembled device 30 utilizing the mounting plates 48 and 49 as in the double construction device.

FIGURE 7 shows a detachable pick-up arm 50 adapted to be mounted on the mounting plates 21 or 48 of the double or single construction devices respectively. A base plate is designated 51, 52 is a bearing mounted on the base plate, 53 is a bracket rotatably mounted on the bearing and 54 is a guide means comprising a hollow tube mounted on the bracket.

Preferably, detachable mounting means are used in order that the hollow tube means can be replaced since the tube wears rapidly in use with certain coiled materials.

FIGURE 8 depicts the pick-up arm device 50 mounted on the double construction dispensing package 60. Wire coiled on the dispensing package 60 is fed through tube means 54 at 55 to emerge at 56.

Figure 9:
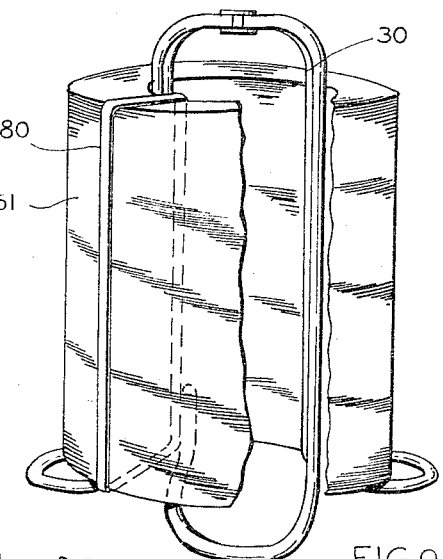
FIGURE 9 is a perspective view of the dispensing package with a coil of wire secured with steel bands for protection.

FIGURE 9 depicts an important aspect of the invention wherein coiled material shown in cutaways 61 is solidly banded with a steel band 80 to the single construction device 30. Banding is easily accomplished by virtue of unique feature of this invention which provides a space between the base plane and the point where the two adjacent identical elements meet to form the vertical leg of the dispensing device. This space allows banding without lifting or tilting the coil of wire.

It is to be understood, of course, that minor variations from the construction described are within the skill of the art. One such variation involves the addition of four substantially L shaped bracing members along the base plane between each of the base members.

Another variation or improvement involves the use of polyethylene plugs especially in the single construction device in order to keep out dirt, water, and allow emersion in oil when the device is made of tubular material, as is preferred.

It is contemplated that a major use of the dispensing package of this invention will be for receiving coils of strip metal. So far as is known, storage, dispensing and transport of such material in a package of this type is not known. The resultant ease of handling of such material and the protection of the package of this material against edge bending and end damages normally associated with handling with lift trucks, chains, cables, etc. would be impressive.

I claim:

1. A dispensing package for coiled material which comprises at least two substantially identical elements, each of said elements having at least one vertical member each having a substantially horizontal inwardly disposed member integrally joined to the upper portion thereof, a substantially U shaped, outwardly directed substantially horizontal base member, one end of said base member being integrally attached to said vertical member, the other end of said base member being joined to the next adjacent identical element along its vertical member at a point substantially above the horizontal base plane, said horizontal inwardly disposed members being commonly attached at their innermost extremities.

2. The dispensing package of claim 1 wherein said horizontal inwardly disposed members are commonly attached to a pair of plates having a cooperative bore, said plates sandwiching said horizontal inwardly disposed members.

3. The dispensing package of claim 1 comprising four substantially identical elements.

4. The dispensing package of claim 2 comprising four substantially identical elements.

5. The dispensing package of claim 1 wherein each element is comprised of two vertical members and two horizontal inwardly disposed members.

6. The dispensing package of claim 2 wherein each element is comprised of two vertical members and two horizontal inwardly disposed members.

7. The dispensing package of claim 3 wherein each element is comprised of two vertical members and two horizontal inwardly disposed members.

8. The dispensing package of claim 4 wherein each element is comprised of two vertical members and two horizontal inwardly disposed members.

9. The dispensing package of claim 1 wherein said vertical member is covered with a protective sheath.

10. The dispensing package of claim 7 wherein said vertical member is covered with a protective sheath.

11. In combination a dispensing package for coiled materials and a pick-up arm device for dispensing coiled materials from said package, said dispensing package comprising at least two substantially identical elements, each of said elements having at least one vertical member each having a substantially horizontal inwardly disposed member integrally joined to the upper portion thereof, a substantially U shaped, outwardly directed substantially horizontal base member, one end of said base member being integrally attached to said vertical member, the other end of said base member being joined to the next adjacent identical element along its vertical member at a point substantially above the horizontal base plane, said horizontal inwardly disposed members being commonly attached at their innermost extremities, said pick-up arm comprising a base member, bearing means mounted on said base member, rotatable bracket means mounted on said bearing means and a guide means detachably mounted on said bracket means, said pick-up arm mounted on said dispensing package at the junction of the horizontal inwardly disposed members of the said identical elements.

12. The dispensing package of claim 11 comprising four substantially identical elements.

13. The dispensing package of claim 11 wherein each element is comprised of two vertical and two horizontal inwardly disposed members.

14. The dispensing package of claim 12 wherein each element is comprised of two vertical and two horizontal inwardly disposed members.

15. The device of claim 11 wherein said guide means comprises a hollow tube having a substantially vertical portion and an outwardly and downwardly extending portion.

References Cited by the Examiner

UNITED STATES PATENTS

| | | | |
|---|---|---|---|
| 3,010,674 | 11/1961 | Dull et al. | 242—128 |
| 3,139,986 | 7/1964 | Strock | 211—59 |
| 3,186,658 | 6/1965 | Kohn et al. | 242—129 |

FRANK J. COHEN, *Primary Examiner.*

L. D. CHRISTIAN, *Assistant Examiner.*